Jan. 2, 1968 R. O. WHITAKER 3,360,997
BI-DIRECTIONAL ROTATIONAL TWO-SPEED TRANSMISSION PROVIDING
LOW-SPEED DRIVE FOR AN INITIAL PERIOD
FOLLOWING EACH REVERSAL
Filed May 10, 1965 3 Sheets-Sheet 1

Jan. 2, 1968   R. O. WHITAKER   3,360,997
BI-DIRECTIONAL ROTATIONAL TWO-SPEED TRANSMISSION PROVIDING
LOW-SPEED DRIVE FOR AN INITIAL PERIOD
FOLLOWING EACH REVERSAL
Filed May 10, 1965   3 Sheets-Sheet 2

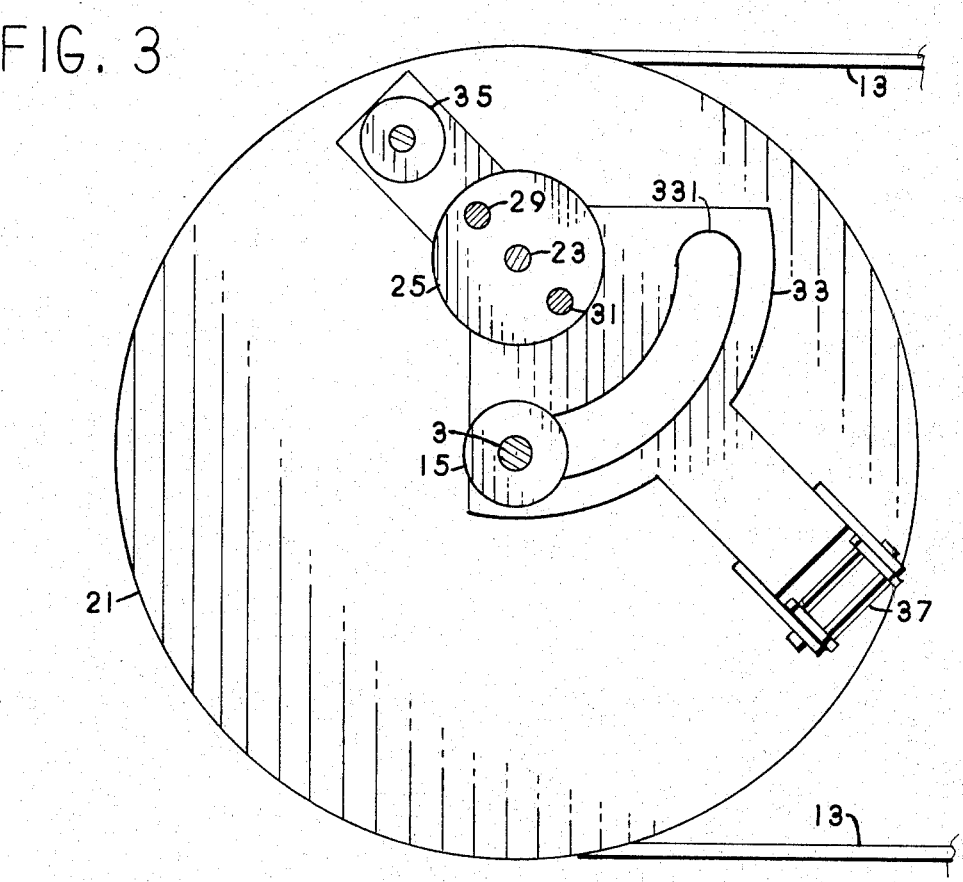

United States Patent Office 3,360,997
Patented Jan. 2, 1968

3,360,997
BI-DIRECTIONAL ROTATIONAL TWO-SPEED TRANSMISSION PROVIDING LOW-SPEED DRIVE FOR AN INITIAL PERIOD FOLLOWING EACH REVERSAL
Ranald O. Whitaker, 3145 N. Delaware, Indianapolis, Ind. 46205
Filed May 10, 1965, Ser. No. 454,391
6 Claims. (Cl. 74—10.5)

ABSTRACT OF THE DISCLOSURE

Means for driving the shaft of the UHF tuner in a TV remote control system. A motor is coupled to the tuner by means of a magnetic clutch. The assembly driven by the magnetic clutch provides a fast drive for slewing the tuner and a slow drive for accurate tuning of the tuner. The invention provides for slow-speed drive for a brief period following each reversal of direction of drive. The slow-speed drive always disengages before the high-speed drive engages.

This invention relates to two-speed transmission systems for coupling a source of rotational power, such as a motor, to a device to be driven, such as the shaft of a UHF tuner; and more particularly to a transmission system which automatically shifts from high speed to low speed upon each reversal of the direction of drive and automatically shifts again to high speed after a short period of drive at low speed.

In the preferred application the present invention is used in TV remote controls to position the tuning shaft of the UHF tuner. For adequate tuning of a TV station it is a mandatory that the shaft of such tuners be positioned with an accuracy of .001 radian. Also, it is desirable that the user be able to slew the tuner from one end of its range to the other in ten seconds. In practice it is found that a single speed remote control system geared slowly enough that the positioning accuracy of .001 radian may be met, is generally so slow that 30 to 40 seconds are required to slew the range. Consequently a transmission is desired which provides both a low speed for positioning the tuner shaft accurately, and a high speed for slewing. According to the present invention the user causes the high speed drive to operate until the desired station is reached and slightly passed. The control is then reversed. This brings the low-speed drive into operation and the user positions the tuner shaft very accurately. Upon desiring to tune a different station, the user operates the control in the desired direction. After an initial period of low-speed drive, the high-speed drive activates. The procedure previously outlined permits the new station to be tuned in.

Accordingly it is the object of the present invention to provide a transmission system for positioning type control systems, which transmission provides a low speed for accurate positioning and a high speed for rapid slewing, the system arranged to provide automatic shifting from high to low speed upon reversal of direction of drive and to shift back to high speed after a short travel at low speed.

For a detailed description of the present invention, reference is made to the accompanying drawings in which:

FIG. 3 is a second sectional view taken along lines indicated in FIG. 1.

FIG. 6 is a block diagram of a TV remote control system in which the present invention could be employed.

FIG. 7 is a third sectional view of FIG. 1 taken along lines indicated and illustrating an alternate provision for stops.

Figure 1:
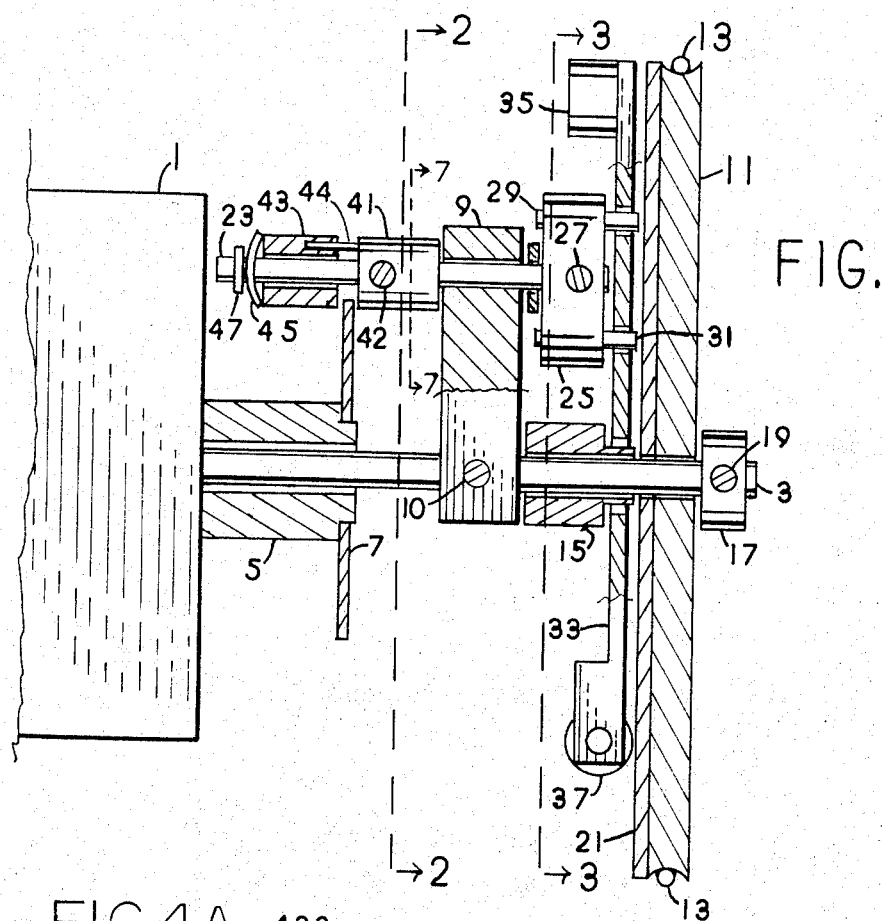
FIG. 1 is a side elevational view partially in section of a two-speed drive constructed in accordance with the present invention.

A tuner frame 1 as indicated in FIG. 1 has rotatably mounted therein a shaft 3 to be rotated for selecting stations. Tuner frame 1 serves as a base for mounting of the two-speed drive hereafter to be described. The end result of the action of the two-speed drive is the rotation of shaft 3. Consequently, and in the parlance of transmission engineering, shaft 3 is referred to as the load shaft. Affixed to tuner 1 is sleeve 5 encompassing shaft 3. Affixed to sleeve 5 is disc 7 generally of a flexible material such as beryllium copper. Affixed to shaft 3 by set screw 10 is arm 9, better illustrated in the sectional view of FIG. 2. Pulley 11 rotates freely on shaft 3 and is held in axial position by collar 17 locked to shaft 3 by set screw 19 and by sleeve 15 bearing against arm 9. Belt 13 driven by a motor not shown serves to drive pulley 11. Disc 21 of magnetic material is fixed to pulley 11. Shaft 23 turns freely in a hole in arm 9. Header 25 is locked to shaft 23 by set screw 27. Pins 29 and 31, also indicated in FIG. 3, are fixed in header 25 and pass through clearance holes in hanger 33. The arrangement is such that rotation of hanger 33 causes corresponding rotation of shaft 23, but the coupling is flexible so that magnet 37 at the opposite end of hanger 33 is free to move into close engagement with disc 21. Consequently activation of magnet 37 causes it to cling to disc 21. Counterweight 35 is chosen to cause the center of mass of hanger 33 to coincide with pin 23. In those applications where shaft 3 is mounted vertically with the tuner uppermost, counterweight 35 may be omitted.

If the user desires to rotate tuner shaft 3 of FIG. 3 in the counterclockwise direction, he causes the motor to turn disc 21 in the counterclockwise direction and at the same time causes magnet 37 to be activated. Magnet 37 clings to disc 21. Since the edge 332 (see FIG. 2) of slot 331–332 in hanger 33 is against shaft 3, rotation of hanger 33 is around shaft 3. The assembly comprising pins 29 and 31, header 25, shaft 23, arm 9, and shaft 3 is rotated together with hanger 33. The entire assembly locked together is turned by magnet 37 clinging to disc 21. This is the high-speed drive. Referring again to FIG. 3, it is noted that hanger 33 can rotate about shaft 23 until either edge 331 or 332 comes against shaft 3. These edges serve as stops to arrest the rotation about shaft 23. Further rotation of hanger 33 is around shaft 3, rather than around shaft 23. Edge 331 stops clockwise rotation. Edge 332 stops counterclockwise rotation. The arrangement constitutes a rotation limiting assembly.

Upon reaching and slightly passing the desired station, the user deactivates the control. Deactivation of magnet 37 causes it to be immediately released by disc 21. This stops the drive of tuner shaft 3 regardless of how much further the motor and disc 21 may coast.

Figure 2:
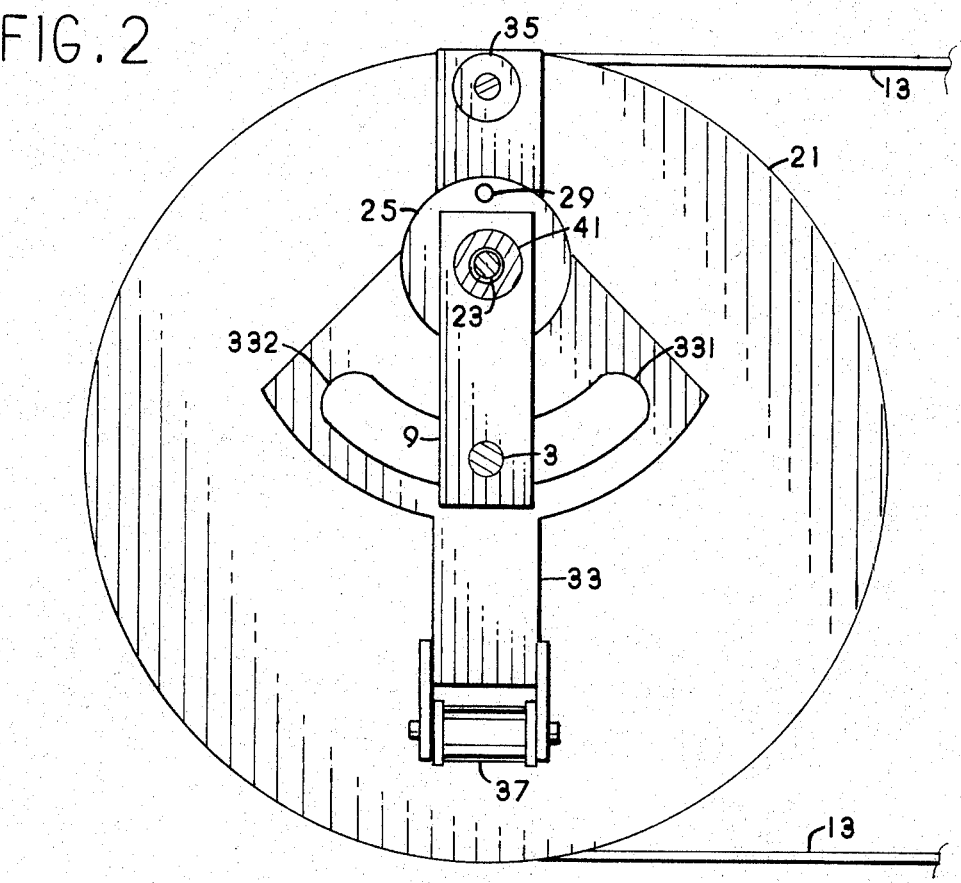
FIG. 2 is a sectional view taken along lines indicated in FIG. 1.

To tune the station in accurately, the user brings into operation the low-speed drive. He does this by reversing the direction of the motor, causing disc 21 of FIG. 3 to rotate in the clockwise direction. Simultaneous activation of magnet 37 causes hanger 33 to tend to rotate with disc 21. Clockwise movement of hanger 33 is about shaft 23, rather than shaft 3. Shaft 3 moves in slot 331–332. Referring again to FIG. 1, rotation of hanger 33 causes rotation of header 25 and shaft 23. Fixed to shaft 23 is wedge collar 41 held by set screw 42. Wedge collar 41 bears against arm 9. Arm 9 is positioned axially on shaft 3 so that collar 9 just clears disc 7. Wedge 43 is mounted loosely on shaft 23 so that it can move axially with ease. Spring 45 held by arc ring 47 biases wedge 43 toward wedge collar 41. Pin 44 fixed in wedge 43 and sliding in a recessed hole in wedge collar 41 causes wedge 43 to rotate with wedge collar 41. The configuration of wedge 43 is such that disc 7 is rather firmly clamped between wedge 43 and wedge collar 41 when hanger 33 is in mid position as indicated in FIG. 2. When hanger 33 is near one of its extreme positions and shaft 3 is near face 331 or 332, wedge 43 releases disc 7. Consequently no hindrance is presented to the high-speed drive. During high-speed drive disc 7 moves freely through the vacant space between wedge 43 and wedge collar 41.

Figure 4A:
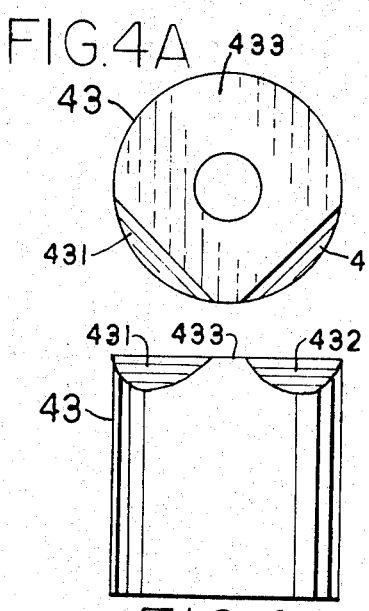
FIG. 4A is an axial view of a wedge suitable for use with the present invention.
Figure 4B:
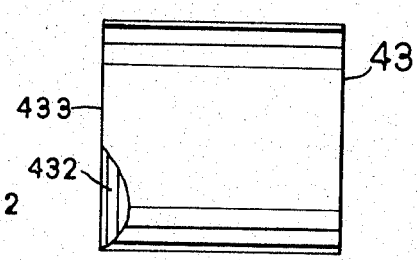
FIG. 4B is a side view of the wedge and showing one of the tapered wedge surfaces.
Figure 4C:
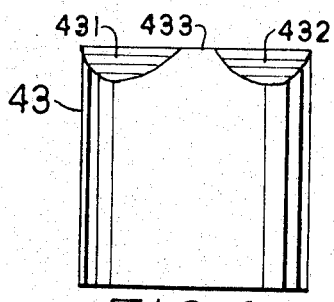
FIG. 4C is a second lateral view of the wedge and showing the lip of the wedge.
Figure 5A:
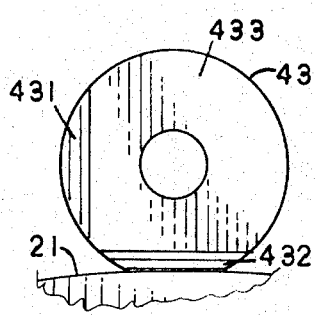
FIG. 5A is a partial view of the system and showing the position of the wedge relative to the disc during high speed drive in one direction.
Figure 5B:
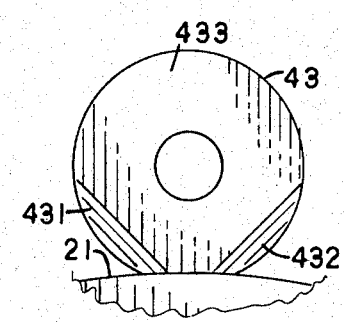
FIG. 5B is a partial view of the system and showing the position of the wedge relative to the disc during low speed drive.
Figure 5C:
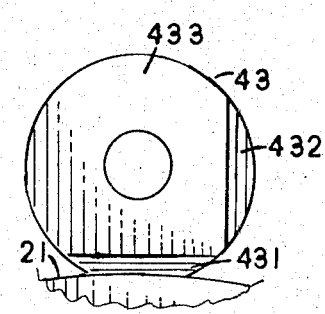
FIG. 5C is a partial view of the system and showing the position of the wedge relative to the disc during high speed drive in a second direction.

FIG. 4 indicates the configuration of wedge 43. A central crown region 433 is bounded by two sloping regions 431 and 432. The operation of the wedge is indicated in FIG. 5. For one extreme position of hanger 33, sloping surface 432 is opposite disc 7. This permits crown 433 to bear against collar 41 and permits disc 7 to slip through the space between face 433 and wedge collar 41. This condition is indicated in FIG. 5A. When hanger 33 is in midposition, the lip of crown 433 bears against disc 7, pressing it firmly against wedge collar 41. This condition is indicated in FIG. 5B. For the other extreme position of hanger 33, disc 7 falls in the open space created between sloping face 431 and wedge collar 41. This condition is indicated in FIG. 5C. The sloping faces facilitate the movement of the system from positions indicated in FIGS. 5A and 5C to that of 5B. As wedge 43 turns, the edge of disc 7 causes wedge 43 to be pushed away from wedge collar 41. The configuration of wedge 43 is such that only for the extreme positions of hanger 33 does disc 7 rotate freely in the slots created by the sloping surfaces 431 and 432.

It follows that, while hanger 33 is in midrange, rotation of shaft 23 causes wedge 43 and wedge collar 41 to "walk around the edge" of disc 7. This in turn causes arm 9 to rotate shaft 3. For the diameters of disc, wedge, and collar illustrated in the drawings, shaft 3 is caused to rotate about one-fifth as fast as shaft 23. By choosing other diameter ratios, the rate ratio may be made any value desired. In general, the final action in positioning the UHF tuner shaft involves pulsing the remote control so that the motor operates in short bursts. Consequently the motor never has time to get up to full speed. This restriction of motor speed is enhanced by placement of a flywheel on the rotor of the motor in accordance with U.S. patent application 440,802. The above constitutes the low speed drive.

The low speed drive engages only during the period that hanger 33 is in midrange. The high speed drive engages only during the period that hanger 33 is in extreme position. Consequently neither drive interferes with the other. In general there will be a small dead zone between the two during the period that wedge 43 is engaging or disengaging disc 7. In tuning the UHF tuner of a TV receiver this dead zone is not objectionable.

For a discussion of a basic remote control system into which the present invention might be incorporated for driving a UHF tuner, reference is made to U.S. Patent 2,743,797. For a drive system for operating a companion VHF tuner reference is made to U.S. Patent 3,162,794. For a basic wireless remote control system for a TV receiver in which the present invention may be employed see U.S. patent application 440,800.

A typical remote control system in which the present invention could be employed is indicated by the block diagram of FIG. 6. A transmitter operated by the viewer transmits a plurality of signals to a remote control receiver located at the TV set. In response to these signals a particular function, such as the tint control or the UHF tuner, is selected to be adjusted and the motor is caused to turn in the proper direction. In response to the signal the particular function is connected to the motor and adjusted until the desired setting is obtained. The present invention is concerned with the coupling mechanism for connecting the motor to the UHF tuner. In driving the UHF tuner of FIG. 6, the arrowed line from receiver 62 to the UHF tuner represents an electrical current delivered by the receiver to electromagnet 37 (FIG. 1) of the two-speed drive. This signal also activates motor 63 which through belt 13 drives pulley 11.

It is noted that during high-speed drive, magnet 37, hanger 33, header 25, shaft 23 and its associated parts, arm 9, and shaft 3 all turn together. Consequently the frictional forces which must be overcome in turning tuner shaft 3 are minimized and restricted to the small amount which may exist between disc 7 and the sides of the slot in which it moves. This reduction to a minimum of resisting frictional torques in remote control systems is particularly desirable since the amount of driving torque is generally limited. Two-speed drive systems for UHF tuners are presently available in which the low speed drive is through a frictional clutch. This clutch is overcome by the high-speed system during high-speed drive. This requires the high-speed drive to suppy sufficient torque to overcome both the tuner resisting torque and the clutch torque. The present invention eliminates the need for excess torque to overcome a clutch during high-speed drive.

Various types of rollers or even gears may replace the wedge and disc system illustrated without departing from the spirit of the invention. Many other drive devices may replace the hanger, magnet, and magnetic disc discussed in this disclosure. It is essential only that shaft 23 be rotated. Similarly, many other type stops may be used to limit the rotation of shaft 23.

One such variation is indicated in FIG. 7. Pins 51 and 53 are positioned in arm 9 as indicated. Pin 55 is fixed in wedge collar 41. Parts are arranged so that pin 55 strikes and is held by pin 53 for clockwise rotation of shaft 23. Pin 55 strikes and is held by pin 51 for counterclockw'se rotation. It is essential only that rotation of shaft 23 relative to arm 9 be limited to a relative small arc.

The present invention may be used in applications other than the tuning of the UHF tuner of a TV receiver. It may be used in setting potentiometer type controls such as those used for tint and color control. It may be used in industrial applications where precise positioning of a dial is required. The present invention may be used advantageously in any application where (1) precise positioning of a shaft is desired, (2) rapid slewing rate is desired, and (3) holding the driving torque to a minimum is desired.

I claim:
1. A two-speed drive system comprising a base;
a load shaft rotatable in said base;
an arm fixed to said load shaft;
a second shaft mounted rotatably in said arm and parallel to said load shaft;
driving means for rotating said second shaft;
limiting means for the rotation of said second shaft relative to said arm, said means comprising a first element fixed to said second shaft and a second element fixed to said arm, said second element being adapted to engage said first element at the limits of the permitted rotation of said second shaft relative to said arm, said means being adapted to cause said arm to rotate with said second shaft upon further rotation of said second shaft ;

coupling means between said second shaft and said base engageable during the period said limiting means is in midregion and adapted in response to rotation of said second shaft for causing the assembly comprising said second shaft, said arm, and said load shaft to rotate about the center of said load shaft.

2. A two-speed drive as in claim 1; said driving means for said second shaft comprising a hanger attached to said second shaft for rotation therewith and carrying an electromagnet, a magnetic disc rotatable about said load shaft and positioned relative to said magnet that activation of said magnet causes said magnet to cling to said disc, driving means for causing rotation of said magnetic disc about the axis of said load shaft, and means for activating said electromagnet.

3. A two-speed drive as in claim 1; said coupling means comprising a disc mounted to said base and concentric with said load shaft; a wedge collar fixed to said second shaft for rotation therewith and positioned relative to said disc that the axial edges thereof are juxtaposed; a wedge consisting of a sleeve slipped over said second shaft, said sleeve being of approximately the same diameter as said wedge collar, said wedge being biased toward said wedge collar by a spring, said wedge being keyed to said second shaft to insure rotation therewith, and said wedge having two axially tapered sections and a crown section so arranged that when said second shaft is against either of said stops, said wedge disc falls into one of the open spaces developed by said tapered sections and when said second shaft is in its midrange said crown section of said wedge clamps said wedge disc to said wedge collar.

4. A two-speed drive in accordance with claim 1 wherein said driving means for said second shaft comprises a hanger attached to said second shaft for rotation therewith and carrying an electromagnet,
a magnetic disc rotatable about said load shaft and so positioned relative to said magnet that activation of said magnet causes said magnet to cling to said disc, driving means for causing rotation of said magnetic disc about the axis of said load shaft, and means for activating said electromagnet;
said coupling means comprising a disc mounted to said base and concentric with said load shaft;
a wedge collar fixed to said second shaft for rotation therewith and so positioned relative to said disc that the disc and wedge collar axial edges are juxtaposed;
a wedge consisting of a sleeve slipped over said second shaft, said sleeve being of approximately the same diameter as said wedge collar, said wedge being connected to said second shaft to insure rotation therewith, and said wedge having two axially tapered sections and a crown section so arranged that when said second shaft is at the limit of said limiting means said wedge disc falls into one of the open spaces developed by said tapered sections and when said second shaft is in its midrange said crown section of said wedge clamps said wedge disc to said wedge collar.

5. A two-speed drive system according to claim 1 wherein said load shaft comprises the tuning shaft of a UHF tuner of a TV receiver.

6. A two-speed drive according to claim 1 wherein said driving means for said second shaft comprises a hanger attached to said second shaft for rotation therewith and carrying an electromagnet, a magnetic disc rotatable about said load shaft and positioned relative to said magnet so that activation of said magnet causes said magnet to cling to said disc, driving means for causing rotation of said magnetic disc about the axis of said load shaft, and means for activating said electromagnet;
said second shaft being coupled to said hanger by means of a header fixed to said second shaft and bearing two pins extending from the surface thereof in the axial direction toward said hanger and passing through corresponding holes in said hanger, the arrangement being such that said hanger is loosely coupled to said header except for rotation of said hanger about the axis of said second shaft.

References Cited

UNITED STATES PATENTS

| 1,632,352 | 6/1927 | Stewart | 74—10.5 |
| 1,671,996 | 6/1928 | Powell | 74—10.5 |
| 1,912,757 | 6/1933 | Brump | 74—10.9 |
| 2,797,582 | 7/1957 | Nestlerode et al. | 74—10.5 |
| 3,122,929 | 3/1964 | Petry | 74—10.5 |

DONLEY J. STOCKING, *Primary Examiner.*

DAVID J. WILLIAMOWSKY, *Examiner.*

L. H. GERIN, *Assistant Examiner.*